United States Patent Office 3,501,428
Patented Mar. 17, 1970

3,501,428
METHOD OF MAKING HIGH DENSITY
POLYETHYLENE FOAM
Nelson S. Marans, Silver Spring, and Forest A. Wessells, Baltimore, Md., assignors to W. R. Grace & Co., New York, N.Y., a corporation of Connecticut
No Drawing. Continuation of application Ser. No. 626,966, Mar. 30, 1967. This application Mar. 25, 1969, Ser. No. 810,932
Int. Cl. C08f 47/10; C08g 53/00; C08j 1/14
U.S. Cl. 260—2.5          10 Claims

ABSTRACT OF THE DISCLOSURE

A high density polyethylene foamed by the decomposition product of polyoxymethylene or paraformaldehyde. A high density polyethylene and polyoxymethylene or paraformaldehyde are blended and heated to a temperature above the melting point of the high density polyethylene to cause shaping of the mixture while decomposing the polyoxymethylene or paraformaldehyde to form the foamed product.

---

The present invention relates to a novel and useful product and a process for preparing the product. More particularly, it relates to a foamed high density polyethylene product and a process for forming the foamed product.

It is known in the art that various materials may be used as foaming agents for plastics. A particularly desirable foam is one employing high density polyethylene as the matrix material. Due to the physical properties and cost of the high density polyethylene such foamed products have received a quite widespread acceptance in the art.

This application is a continuation of application Ser. No. 626,966, filed Mar. 30, 1967, now abandoned.

Accordingly, it is an object of the present invention to provide a novel foamed high density polyethylene product. Another object is to provide a relatively inexpensive foam having good physical properties. A still further object is to provide a high density polyethylene foam having a quite uniform closed cell structure. Other objects will become apparent as the description of the invention proceeds.

These objects are accomplished by the present invention which provides a high density polyethylene polymer foamed by the decomposition product of a material selected from the group consisting of polyoxymethylene and paraformaldehyde.

The present invention also provides a method for preparing a foamed high density polymer which comprises mixing a high density polyethylene polymer and a material selected from the group consisting of polyoxymethylene and paraformaldehyde and thereafter heating the mixture to a temperature above the melting point of the high density polyethylene polymer to shape the mixture and decompose the said material to form the mixture into a foam.

In a preferred embodiment of the present invention, a high density polyethylene polymer having a density above about 0.935 is mixed with polyoxymethylene to form the foam. More preferably, a high density polyethylene polymer having a density above about 0.945 is employed in the foamable mixture.

The "high density polyethylene" polymer employed in the present invention is polyethylene homopolymer or a copolymer containing up to about 20% by weight of another alpha-olefin comonomer. In general, the high density polyethylene will have a density above 0.935 and preferably above about 0.945. The melt index may be varied as desired. The process for forming such polymers is completely disclosed in U.S. Patents 2,875,271 and 2,949,447 and many other patents. The polymers are available commercially from many suppliers and hundreds of millions of pounds are sold annually.

The polyoxymethylene employed in the present invention may be formed by any one of a number of different processes. Preferably, it is formed by first irradiating trioxane at a dosage of from about 0.1 to about 20 megarads which causes active polymerization sites to be formed. The trioxane is then heated at a temperature of from about 35° C. to about 60° C. to cause polymerization of the trioxane into polyoxymethylene. Of course, a longer period of time is required for polymerization at the lower temperatures and shorter periods of time at higher temperatures.

The high energy ionizing radiation may be electrons, deuterons, positrons, alpha particles, X-ray and gamma rays having sufficient energy to induce active sites in the trioxane. Preferably, the source of irradiation will be a conventional Van de Graaff accelerator. The trioxane is irradiated in the solid state, that is, at a temperature below the melting point of the trioxane. Conveniently, the irradiation is conducted at room temperature.

The polyoxymethylene decomposes at a temperature above about 125° C. but the mixture must be heated above the melting point of the high density polyethylene polymer to form the foam. Preferably, the decomposition is accomplished at a temperature of from about 150° C. to about 250° C. More preferably a temperature of from about 170° C. to about 220° C. is utilized so that the decomposition takes place in a matter of 10 minutes or less. The decomposition is, of course, a time temperature relationship and longer periods will be required at lower temperatures.

In place of polyoxymethylene, paraformaldehyde may be used in the same weight proportions as the polyoxymethylene. Paraformaldehyde is readily available as an article of commerce and it decomposes at approximately the same temperature as the polyoxymethylene. Obviously, mixtures of the two materials may also be used to form the high density polyethylene foam.

The polyoxymethylene and/or paraformaldehyde and high density polyethylene may be utilized in any proportions. When a more foamed product is desired, more of the polyoxymethylene (and/or paraformaldehyde) must be employed. In general, it is preferred to use up to about 20% by weight of polyoxymethylene (and/or paraformaldehydes) based on the weight of the high density polyethylene employed. More preferably, from about 3 to about 10% by weight is employed.

The following examples are given to illustrate the invention and are not intended to limit it in any manner. All parts are given in parts by weight unless otherwise expressed.

The polyoxymethylene employed in the examples is formed by irradiating trioxane at room temperature at a dosage of 2.0 megarads of 2 mev. electrons at room temperature in two passes under the beam of a Van de Graaff accelerator. The irradiation causes active polymer sites to be formed in the trioxane which is then polymerized at a temperature of 55–60° C. for a period of 60 minutes. The trioxane is removed from the polyoxymethylene by washing with water, then acetone and drying in an oven at 50° C. for 16 hours.

Example 1

A mixture is prepared by dry blending in a breaker 6 grams of polyoxymethylene of —20+40 mesh and 100 grams of a commercial high density polyethylene copolymer (containing about 1% of butene-1) of —20+40 mesh having a density of 0.950 and a melt index of 5.0.

The mixture is placed between two sheets of aluminum foil and placed in an oven at 200° C. which melts the polyethylene and decomposes the polyoxymethylene. After 30 minutes a foam has developed between the sheets.

The density of the foam is 0.28 gram/cm.³. The foam is a closed cell structure containing bubbles having diameters of from about a few tenths of a millimeter to about 1 millimeter.

Example 2

The procedure of Example 1 is repeated employing 6 grams of paraformaldehyde instead of 6 grams of polyoxymethylene.

The density of the foam is 0.30 gram/cm.³. The foam is a closed cell structure containing bubbles having a diameter of less than about 1 millimeter.

Example 3

A mixture is prepared by dry blending in a beaker 6 grams of polyoxymethylene of −20+40 mesh and 100 grams of commercial high density polyethylene homopolymer of −20+40 mesh having a density of 0.960 and a melt index of 5.0. The mixture is placed in an aluminum oxide lined 16 cm. petri dish. The aluminum oxide is used as a heat transfer medium. The dish is placed in an oven at 200° C. After 30 minutes a foam has developed in the dish.

The density of the foam is 0.26 gram/cm.³. The foam is a closed cell structure containing bubbles having a diameter of less than 1 millimeter.

Example 4

The procedure of Example 1 is repeated employing 4 grams of polyoxymethylene instead of 6 grams.

The density of the foam is 0.33 gram/cm.³. The foam is a closed cell structure containing bubbles having a pore size of less than 2 millimeters.

While in the above examples only unmodified compositions are employed, it is obvious that other materials such as dyes, pigments, fibers, fillers, plasticizers and the like may be introduced into the composition without substantial alteration of the desired physical properties.

The product of the present invention is useful in making packing material, insulation, foamed bowling pins, shoe lasts, furniture legs and the like.

Many equivalent modifications and variations of the present invention will be apparent to those skilled in the art from a reading of the foregoing without a departure from the inventive concept.

What is claimed is:
1. A method for preparing a foamed high density polyethylene which comprises:

(a) mixing a high density polyethylene and paraformaldehyde; and
 (b) heating the mixture to a temperature above the melting point of the high density polyethylene to shape the mixture and decompose the said material to form the mixture into a foam.

2. The method of claim 1 wherein the high density polyethylene has a density above about 0.935.

3. The method of claim 1 wherein the high density polyethylene is a component of a copolymer of ethylene polymer.

4. The method of claim 1 wherein the mixture is heated to a temperature of about 150° C. to about 250° C.

5. The method of claim 1 wherein the mixture is heated to a temperature of about 170° C. to about 220° C.

6. A method for preparing a foamed high density polyethylene which comprises:
 (a) mixing a high density polyethylene and polyoxymethylene formed by
  (1) irradiating solid trioxane at a dosage of from about 0.1 to about 20 megarads, after which polymerization is effected at a temperature of from about 35° C. to about 60° C., and
 (b) heating the mixture to a temperature above the melting point of the high density polyethylene to shape the mixture and decompose the said material to form the mixture into a foam.

7. The method of claim 6 wherein the high density polyethylene has a density above about 0.935.

8. The method of claim 6 wherein the high density polyethylene is a component of a copolymer of ethylene polymer.

9. The method of claim 6 wherein the mixture is heated to a temperature of about 150° C. to about 250° C.

10. The method of claim 6 wherein the mixture is heated to a temperature of about 170° C. to about 220° C.

References Cited

UNITED STATES PATENTS

| | | | |
|---|---|---|---|
| 2,628,945 | 2/1953 | Wayne | 260—2.5 |
| 3,098,831 | 7/1963 | Carr | 260—2.5 |
| 3,098,832 | 7/1963 | Pooley et al. | 260—2.5 |
| 3,290,261 | 12/1966 | Goldblum. | |

MURRAY TILLMAN, Primary Examiner

MORTON FOELAK, Assistant Examiner

U.S. Cl. X.R.

204—159.21; 260—897